(12) United States Patent
Song (10) Patent No.: US 7,697,107 B2
(45) Date of Patent: Apr. 13, 2010

(54) LIQUID CRYSTAL DISPLAY DEVICE AND METHOD FOR MANUFACTURING THE SAME

(75) Inventor: In Duk Song, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 959 days.

(21) Appl. No.: 11/319,558

(22) Filed: Dec. 29, 2005

(65) Prior Publication Data

US 2006/0268216 A1 Nov. 30, 2006

(30) Foreign Application Priority Data

May 31, 2005 (KR) .................... 10-2005-0046140

(51) Int. Cl.
*G02F 1/1333* (2006.01)
(52) U.S. Cl. .................... 349/158; 349/155; 349/156; 349/157; 349/187
(58) Field of Classification Search ............... 349/155, 349/158, 187
See application file for complete search history.

(56) References Cited

U.S. PATENT DOCUMENTS

| 7,057,695 | B2 * | 6/2006 | Mun et al. ............... 349/141 |
| 7,068,342 | B1 * | 6/2006 | Lee ......................... 349/155 |
| 7,179,673 | B2 * | 2/2007 | Song et al. ................. 438/30 |
| 7,433,004 | B2 * | 10/2008 | Tsubata et al. ............ 349/106 |
| 2001/0040665 | A1 * | 11/2001 | Ahn ........................ 349/156 |
| 2004/0233378 | A1 * | 11/2004 | Okamoto et al. ......... 349/156 |
| 2004/0239865 | A1 * | 12/2004 | Kuroha ................... 349/155 |
| 2004/0263766 | A1 * | 12/2004 | Lee et al. ................. 349/156 |
| 2005/0099579 | A1 * | 5/2005 | Yoo et al. ................ 349/155 |
| 2007/0133636 | A1 * | 6/2007 | Park et al. ............ 372/45.012 |

FOREIGN PATENT DOCUMENTS

KR 10-2003-0076080 A 9/2003

* cited by examiner

*Primary Examiner*—David Nelms
*Assistant Examiner*—Thanh-Nhan P Nguyen
(74) *Attorney, Agent, or Firm*—Morgan Lewis & Bockius LLP (57) ABSTRACT

A mother glass panel for manufacturing a plurality of liquid crystal displays (LCD) includes a first substrate; a second substrate attached to the first substrate, wherein column spacers are disposed between the first and second substrates to form cell gaps; and a liquid crystal layer interposed between the first substrate and the second substrate, wherein, the mother glass panel defines a plurality of liquid crystal display regions and at least two of the liquid crystal display regions have different cell gaps.

22 Claims, 9 Drawing Sheets

LIQUID CRYSTAL DISPLAY DEVICE AND METHOD FOR MANUFACTURING THE SAME

This application claims the benefit of Korean Application No. 046140/2005 filed in Korea on May 31, 2005, which is hereby incorporated by reference.

BACKGROUND OF THE INVENTION

1. Field of the Invention

The present invention relates to a liquid crystal display device (LCD), and more particularly, to an LCD capable of securing a wide viewing angle by forming a plurality of liquid crystal cells having different liquid crystal cell sizes and different cell gaps over one mother glass.

2. Description of the Related Art

Traditionally, a cathode ray tube (CRT) has been used as an information display device because of advantageous characteristics such as better image quality on a screen and lower price. However, due to the poor portability of the CRT because of its size and weight, liquid crystal display devices (LCDs) have been actively developed in recent years. The LCD devices meet the demand of lightweight and miniaturized size. Furthermore, the LCD devices include more powerful performances, for example, micronization and low power consumption or the like, to overcome the disadvantages of the CRT. Thus, the LCD devices gained popularly as the mainstream information processing apparatuses of today.

The LCD includes a thin film transistor (TFT) and a pixel electrode formed on a substrate (i.e., TFT substrate), and a color filter substrate where a red, a green, and a blue color filters are formed. The TFT acts as a switching device. The LCD further includes a liquid crystal film interposed between the TFT substrate and the color filter substrate, thereafter two substrates are attached to each other. A plurality of liquid crystal cells having the same cell region are formed over a mother glass. In addition, a multi mode on glass (MMG) model LCD has been developed, in which the liquid crystal cells having different sizes are formed on the single mother glass.

Figure 1:
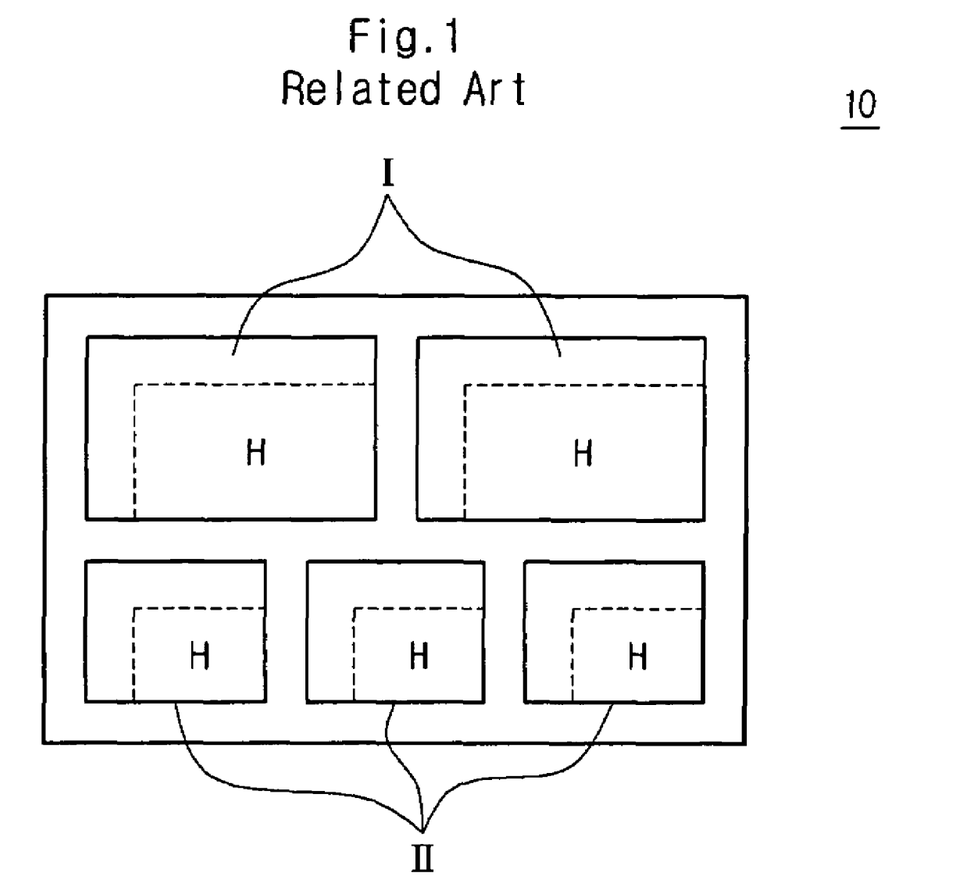
FIG. 1 a schematic view illustrating a related art MMG model LCD.

FIG. 1 is a schematic view illustrating a related art MMG model LCD. As shown in FIG. 1, liquid crystal cells having cell regions I and II with different sizes are formed on a mother glass 10. The two substrates, the TFT substrate and the color filter substrate, are attached to each other in these regions. A first cell region I includes a large-sized liquid crystal cell having a size of 20 inches or more, whereas a second cell II includes a smaller-sized liquid crystal cell having a size of 15 inches or less. Since the liquid crystal cells having the cell regions I and II are formed simultaneously over one mother glass 10 in the MMG model, the liquid crystal panels of various sizes may be manufactured through one process. In FIG. 1, each capital letter H in the liquid crystal cells denotes the cell gap and it is understood that all of the liquid crystal cells have the same cell gap H regardless of the cell size according to the related art MMG model LCD.

Figure 2A:
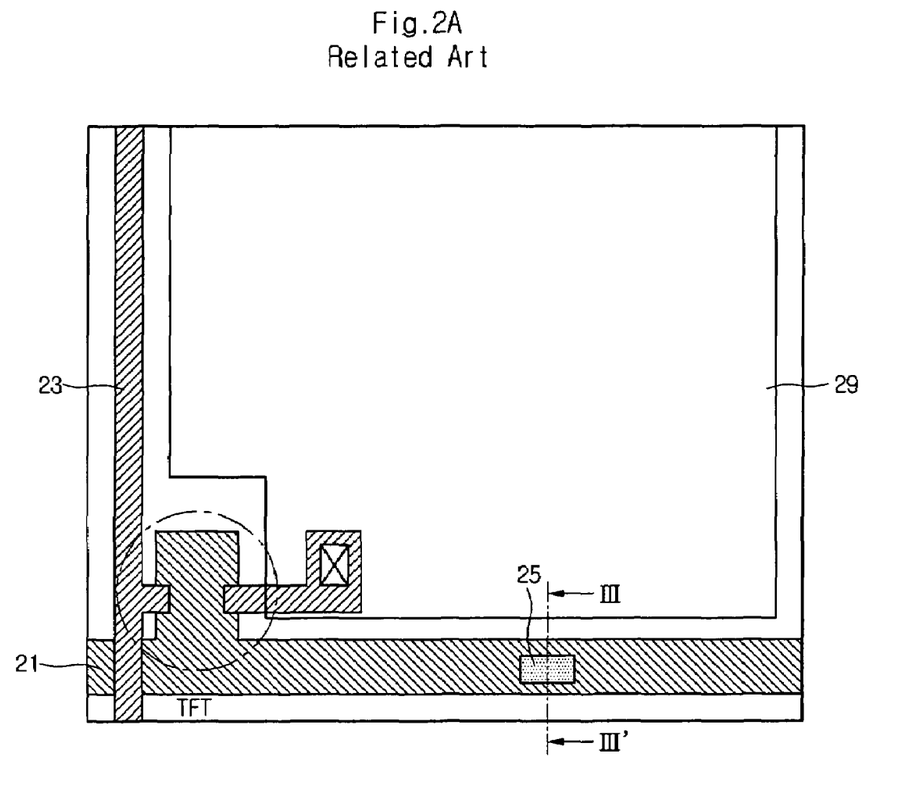
FIG. 2A is a schematic view illustrating a location where a column spacer is formed in a unit pixel region according to the related art.
Figure 2B:
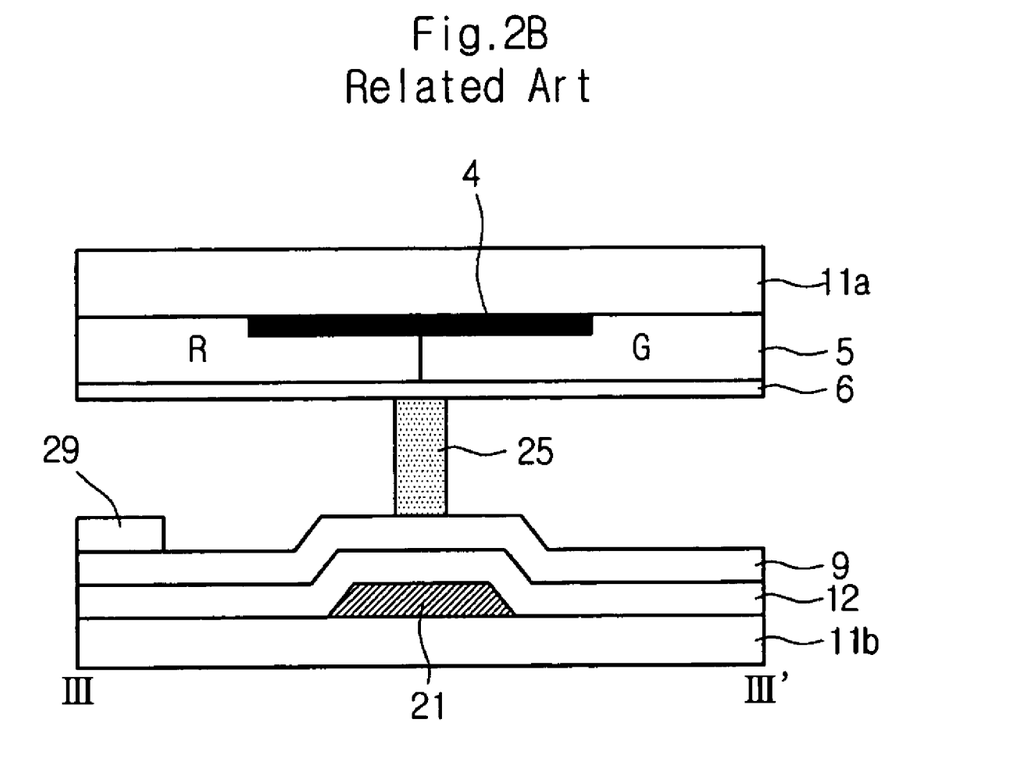
FIG. 2B is a cross-sectional view taken along line III-III' of FIG. 2A.

FIG. 2A is a schematic view illustrating a location where a column spacer is formed in a pixel region according to the related art MMG model LCD. FIG. 2B is a cross-sectional view taken along line III-III' of FIG. 2A. As shown in FIG. 2A, a gate line 21 is arranged in a horizontal direction crossing a data line 23 to define the pixel region, and a pixel electrode 29 is arranged in the pixel region. In addition, a TFT (i.e., a switching device) is formed at an intersection of the gate line 21 and the data line 23.

A column spacer 25 is formed over the gate line 21 to maintain a predetermined cell gap, or alternatively positioned over the gate line 21 to maintain the predetermined cell gap when attaching the color filter substrate to the TFT substrate. The column spacer 25 may be formed by patterning, on the TFT substrate or the color filter substrate. The region where the column spacer 25 is formed or positioned over the gate line 21 is a blocking region.

As shown in FIG. 2B, the gate line 21, a gate insulating layer 12 and a passivation layer 9 are formed over a first insulating substrate 11b in sequence. A reference numeral 29 denotes a pixel electrode. Over the column spacer 25, a color filter substrate including a black matrix 4, a color filter layer 5 and a common electrode 6 is formed over a second insulating substrate 11a. The column spacer 25 is placed over the gate line 21 (i.e., the blocking region of the TFT substrate) and under the black matrix 4 (i.e., the blocking region of the color filter substrate) to maintain the cell gap between the two insulating substrates 11a and 11b.

Figure 3:
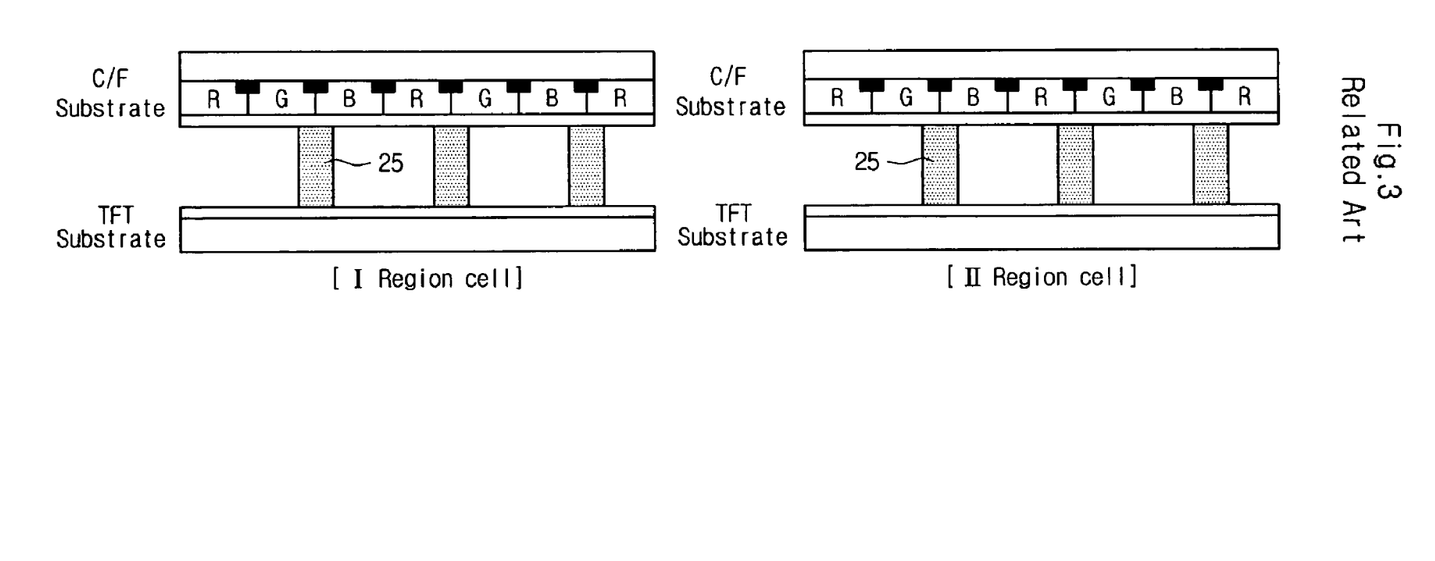
FIG. 3 is a cross-sectional view illustrating a cell gap of two liquid crystal cells in a related art MMG model LCD.

FIG. 3 is a cross-sectional view illustrating the cell gap of two liquid crystal cells in the related art MMG model LCD. Referring to FIG. 3, when the column spacer 25 is formed in a predetermined shape as illustrated in FIGS. 2A and 2B, the height of cell gap in the first cell region I and II are equal. Accordingly, when the liquid crystal cells having different sizes from one another are formed as in the related art MMG model, the liquid crystal panels with various sizes may be manufactured through single process.

However, as illustrated in FIG. 3, since the cell gaps of the all liquid crystal cells are identically formed regardless of resolution or size of each cell, it is difficult to manufacture the LCD having various viewing angles. For example, after cutting the liquid crystal cells from the related art MMG model mother glass, a wide view polarizer must be attached to secure a wide viewing angle. Thus, the wide view polarizer plays a major role in securing the wide viewing angle that corresponds to a retardation value And of the liquid crystal cell.

However, if all the liquid crystal cells having different resolution and sizes are formed such that they have the same cell gap regardless of the cell size or the like, all the retardation values become equal to one another. As a result, all the liquid crystal cells have the same viewing angle regardless of their size or the like. Therefore, various-sized liquid crystal cells cannot be formed using one glass substrate to secure an optimized viewing angle in each liquid crystal cell.

SUMMARY OF THE INVENTION

Accordingly, the present invention is directed to a liquid crystal display (LCD) and a method for manufacturing the same that substantially obviate one or more problems due to limitations and disadvantages of the related art.

An object of the present invention is to provide an MMG model LCD capable of forming liquid crystal cells having various viewing angles by forming different cell gaps in appropriate liquid crystal cells, where the liquid crystal cells have the different sizes from one another.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described, a liquid crystal display device and method for manufacturing the same includes a mother glass panel for manufacturing a plurality of liquid crystal displays (LCD) includes a first substrate; a second substrate attached to the first substrate, wherein column spacers are disposed between the first and second substrates to form cell gaps; and a liquid crystal layer interposed between the first substrate and the second substrate, wherein, the mother glass panel defines a plurality of liquid crystal display regions and at least two of the liquid crystal display regions have different cell gaps.

In another aspect, a method for manufacturing a plurality of liquid crystal display includes forming gate lines, data lines and thin film transistors on a first insulating substrate, wherein the thin film transistors are formed at intersections of the gate lines and the data lines; forming pixel electrodes in pixel regions, wherein the pixel regions are defined by intersections of the gate and data lines; disposing column spacers on the first or a second insulating substrates to form cell gaps; attaching the first insulating substrate and the second insulating substrate; and cutting the attached substrates to form the plurality of liquid crystal displays, wherein at least two of the liquid crystal displays have different cell gaps.

In another aspect, a mother glass panel for manufacturing a plurality of liquid crystal displays (LCD) includes a first insulating substrate; data lines, gate lines, thin film transistors and pixel electrodes on a second insulating substrate; at least one first hole defined through portions of the gate lines; at least one second hole defined through portions of a passivation layer, a gate insulating layer and portions of the gate lines; column spacers disposed on the first or second insulating substrates, wherein at least one column spacer is disposed within the first hole forming a first cell gap, at least another column spacer is disposed within the second hole forming a second cell gap, and at least another column spacer is disposed over the data line forming a third cell gap; and a liquid crystal layer interposed between the first and second insulating substrates.

In another aspect, a method for manufacturing an LCD includes forming a gate line and a gate electrode on an insulating substrate; forming a hole through the gate line and a column spacer in the hole to form a cell gap; forming a gate insulating layer and an active layer on the insulating substrate where the gate electrode is formed, the active layer including a channel layer and an ohmic contact layer; forming source and drain electrodes and a data line on the insulating substrate where the active layer is formed; forming a passivation layer on the insulating substrate where the source and drain electrodes are formed, wherein a contact hole is formed through the passivation layer on the drain electrode; forming a pixel electrode by forming a transparent metal on the insulating layer where the passivation layer is formed and within the contact hole; attaching the insulating substrate to a second substrate; and interposing a liquid crystal layer between the insulating substrate and the second substrate.

In another aspect, a method for manufacturing an LCD includes forming a gate line and a gate electrode on an insulating substrate; forming a gate insulating layer and an active layer on the insulating substrate where the gate electrode is formed, the active layer including a channel layer and an ohmic contact layer; forming source and drain electrodes and a data line on the insulating substrate where the active layer is formed; forming a column spacer over the data line to form a cell gap; forming a passivation layer on the insulating substrate where the source and drain electrodes are formed, wherein a contact hole is formed through the passivation layer on the drain electrode; attaching the insulating substrate to a second substrate; and interposing a liquid crystal layer between the insulating substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 4:
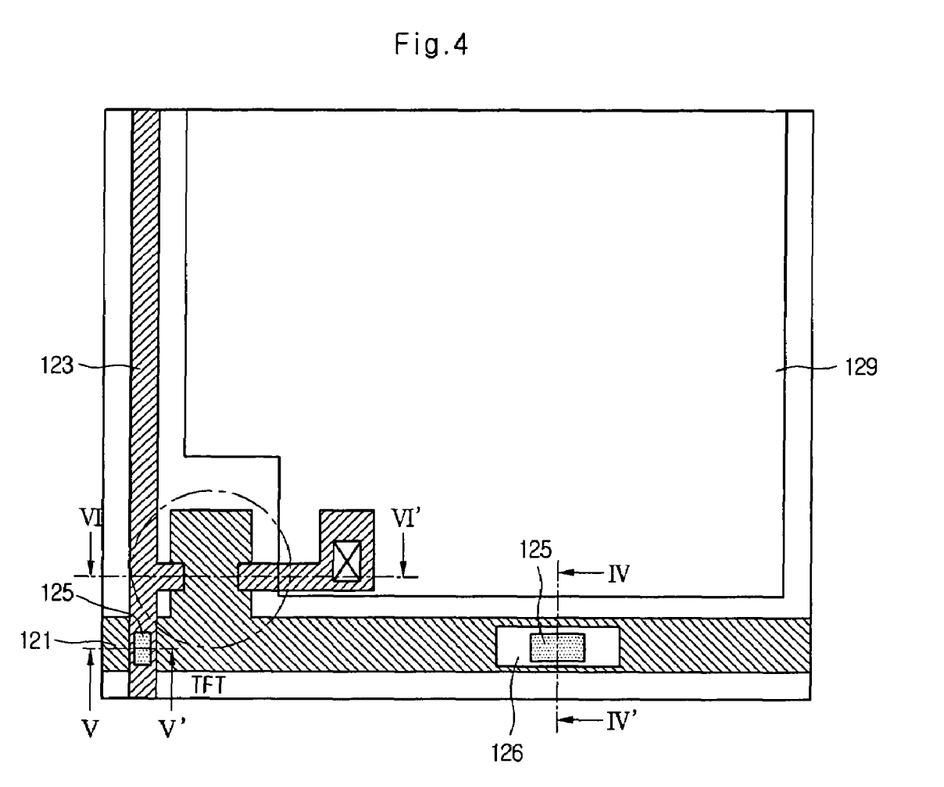
FIG. 4 is a schematic view illustrating a location where a column spacer is formed in a unit pixel region according to a first exemplary embodiment of the present invention.

FIG. 4 is a schematic view illustrating a unit pixel region in a first exemplary MMG model liquid crystal cells according to the present invention. The MMG model liquid crystal cells are formed over a single glass substrate. In FIG. 4, a location where a column spacer is formed is indicated. In the unit pixel region, a gate line 121 is arranged in a horizontal direction to cross a data line 123, and a pixel electrode 129 is arranged in the unit pixel region. In addition, a TFT (i.e., switching device) is formed at an intersection of the gate line 121 and the data line 123. A column spacer 125 is formed over the gate line 121 and/or the data line 123 to maintain the cell gap. The column spacer 125 is formed by patterning, on a TFT substrate or a color filter substrate.

In the first exemplary embodiment of the present invention, the column spacer 125 is positioned over the data line 123 or the gate line 121. Thus, the liquid crystal cells can be manufactured having various cell gaps. As shown in FIG. 4, the column spacer 125 may be formed or positioned within a hole 126. The hole 126 is defined through the gate line 121. Alternatively, the column spacer 125 may be formed or positioned over the gate line 121. In addition, the column spacer 125 may be formed or positioned over the data line 123. Accordingly, if the column spacer 125 having the same height or thickness is formed or positioned over the gate line 121 or the data line 123, thereafter the two substrates, the TFT substrate and the color filter substrate, are attached to each other, it is possible to form the liquid crystal cells having various cell gaps. As described above, the column spacer 125 is formed at different locations or the column spacer 125 is positioned differently when attaching the substrates to each other, thereby achieving the various cell gaps.

Figure 5A:
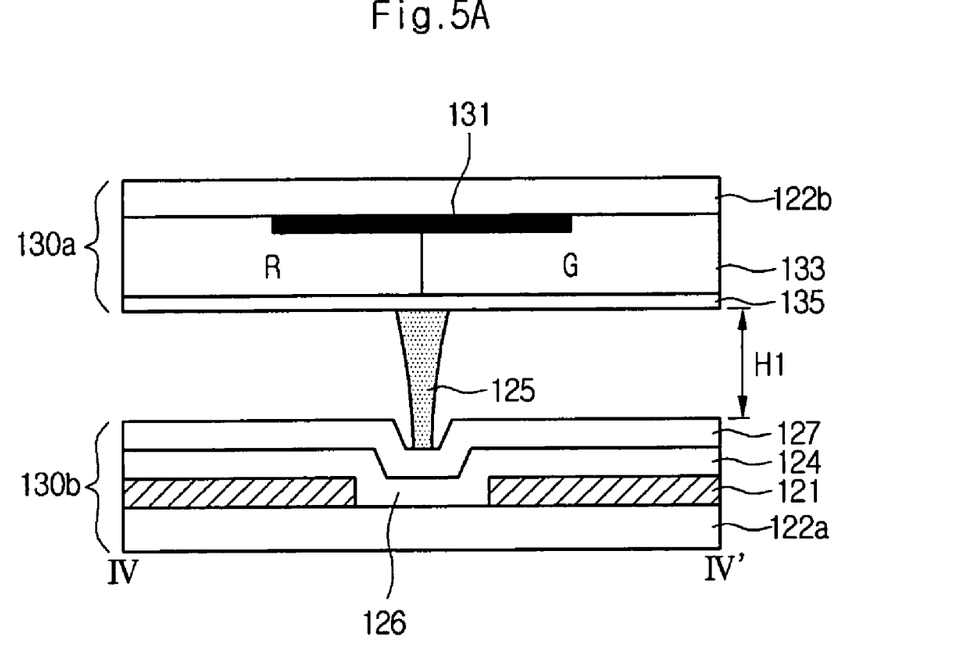
FIG. 5A is a cross-sectional view taken along line IV-IV' of FIG. 4.
Figure 5B:
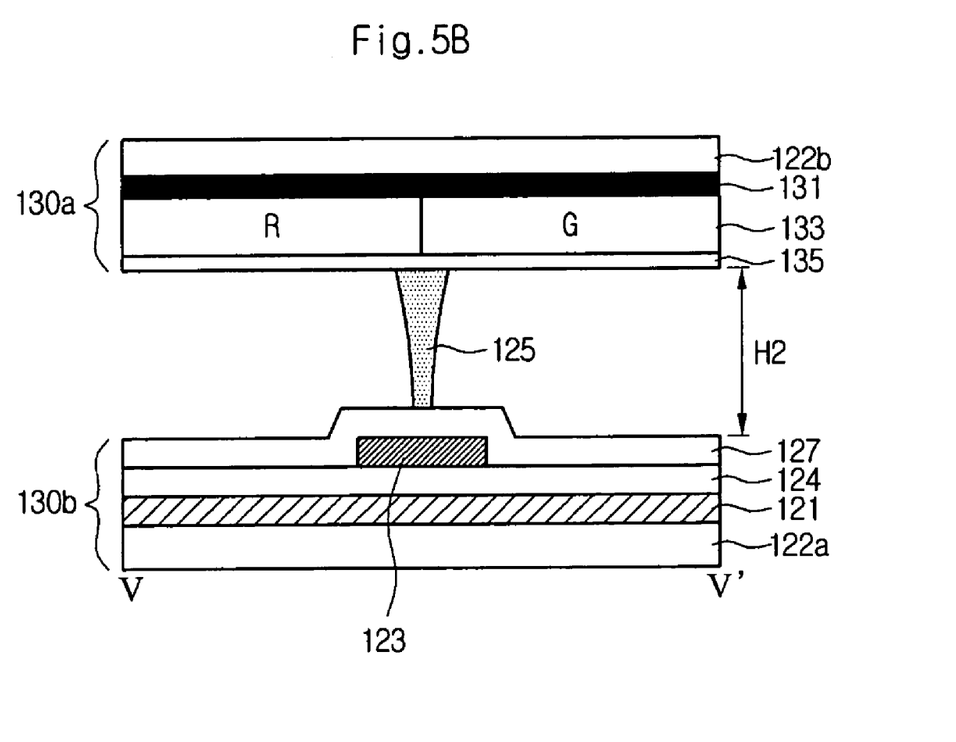
FIG. 5B is a cross-sectional view taken along line V-V' of FIG. 4.

FIGS. 5A and 5B details the liquid crystal cells having different sizes and different cell gaps. FIG. 5A is a cross-sectional view taken along line IV-IV' of FIG. 4, and FIG. 5B is a cross-sectional view taken along line V-V' of FIG. 4. Referring to FIGS. 5A and 5B, a TFT substrate 130b and a color filter substrate 130a are attached to each other forming a mother glass panel, wherein a column spacer 125 is positioned therebetween. The TFT substrate 130b includes a gate line 121, a gate insulating layer 124 and a passivation layer 127 over a first insulating substrate 122a. The color filter substrate 130a includes a black matrix 131, a color filer layer 133 and a common electrode 135 formed over a second insulating substrate 122b. The column spacer 125 is formed or positioned within the hole 126 to keep the first cell gap H1 between the color filter substrate 130a and the TFT substrate 130b.

Whereas, in FIG. 5B, the column spacer 125 is formed or positioned over the data line 123, thereafter the TFT substrate 130b and the color filter substrate 130a are attached to each other. Since the column spacer 125 is formed or positioned over the data line 123, the second cell gap H2 becomes greater than the first cell gap H1 of FIG. 5A. In addition, though it is not shown in the drawings, when the column spacer 125 is formed or positioned over the gate line 121, the cell gap formed by such placement may be different from the first cell gap H1 and the second cell gap H2. Accordingly, the liquid crystal cells can be formed having various cell gaps by controlling the regions/locations where the column spacer 125 is formed/positioned over the TFT substrate 130b or over the color filter substrate 130a without modifying the height of the column spacer 125.

Figure 6:
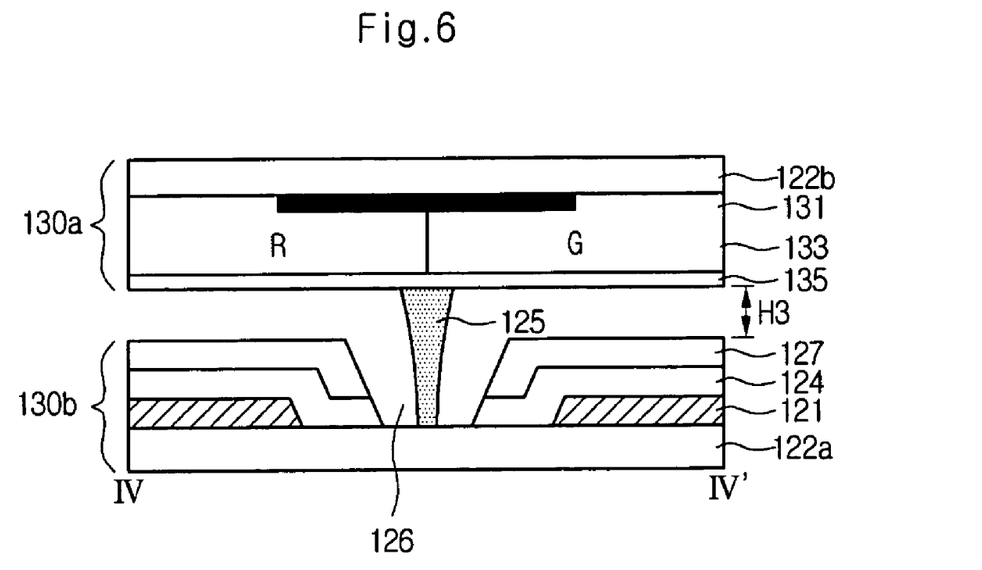
FIG. 6 is a cross-sectional view taken along line IV-IV' of FIG. 4 according to a second exemplary embodiment of the present invention.

FIG. 6 is a cross-sectional view taken along line IV-IV' of FIG. 4 according to a second exemplary embodiment of the present invention. Referring to FIG. 6, when the column spacer 125 is formed or positioned over the first insulating substrate 122a within the hole 126, a portion of the first insulating substrate 122a is exposed within the hole 126. As shown in FIG. 6, the hole 126 is defined by etching a portion of the multiple layers including the gale line 121, the gate insulating layer 124 and the passivation layer 127. In addition, the hole 126 and a contact hole 150 are defined through the same etching process (refer to FIGS. 8D, 8E and 9 for the contact hole 150).

The black matrix 131, the color filter layer 133 and the common electrode 135 are formed over the second insulating substrate 122b in sequence, thereby forming the color filter substrate 130a. Then, the column spacer 125 is formed over the color filter substrate 130a within the black matrix region 131. The black matrix region 131 corresponds to the region where the hole 126 is defined when the two substrates are faced each other. After the column spacer 125 is formed over the color filter substrate 130a, the TFT substrate 130b and the color filter substrate 130a are attached to form the mother glass panel. While attaching the two substrates, the column spacer 125 is positioned within the hole 126 of the TFT substrate 130b. Therefore, a third cell gap H3 shorter than the first cell gap H1 if formed.

As described above, although the column spacer 125 is formed equal in height or thickness to that of the related art, various cell gaps can be formed by controlling the locations where the column spacer 125 if formed, as illustrated in FIGS. 5A, 5B and 6. While it is illustrated that the column spacer 125 is formed over the color filter substrate 130a, it is possible to implement various cell gaps regardless of where on the color filter substrate, the column spacer 125 is formed.

Figure 7:
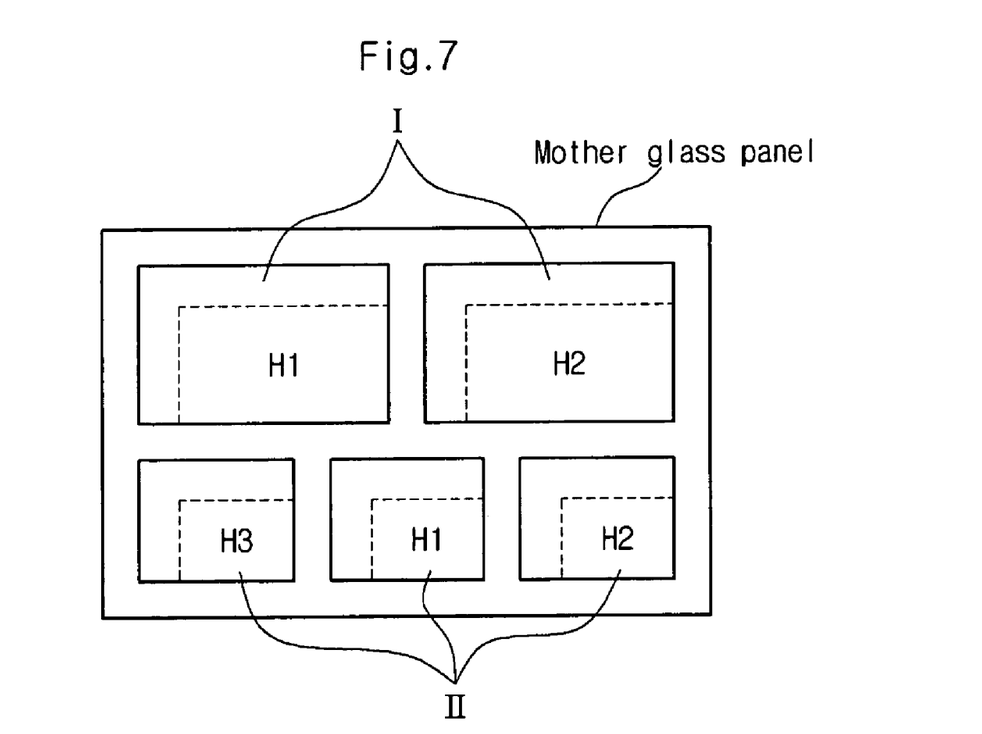
FIG. 7 is a cross-sectional view illustrating different cell gaps of liquid crystal cells in the MMG model LCD according to the second exemplary embodiment of the present invention.

FIG. 7 is a cross-sectional view illustrating a cell gap in each liquid crystal cell according to the MMG model LCD (i.e., a mother glass panel) of the present invention. The liquid crystal cell region I includes liquid crystal cells having different cell gaps H1 and H2, and the liquid crystal cell region II includes liquid crystal cells having different call gaps H1, H2 and H3. The cell gaps, H1 and H2, are formed in a similar manner as illustrated in FIGS. 5A and 5B. Likewise, the cell gap H3 is formed in a similar manner as illustrated in FIG. 6. As described above, the column spacer may be positioned at desired locations shown in FIG. 5A, 5B or 6 so that various cell gaps may be formed. Thus, when forming a plurality of liquid crystal cells having different sizes over a single mother glass, the cell gap of each liquid crystal cell can be adjusted by controlling the region where the column spacer is positioned.

FIGS. 8A to 8E are cross-sectional views illustrating a first exemplary fabricating method of a MMG model LCD according to the first embodiment of the present invention. The cross-sectional views are taken along lines VI-VI' and IV-IV' of FIG. 4.

Figure 8A:
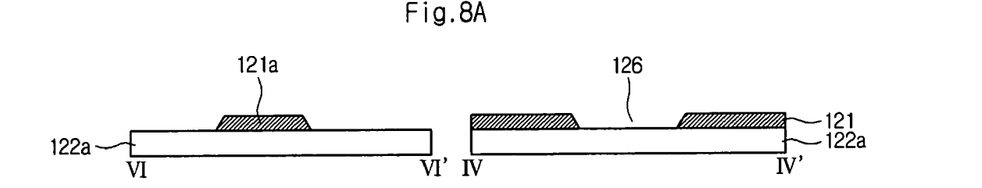
FIGS. 8A to 8E are cross-sectional views illustrating a first exemplary fabricating method of the MMG model LCD taken along lines VI-VI' and IV-IV' of FIG. 4.

As illustrated in FIG. 8A, after depositing a metal layer on the first insulating substrate 122a, the metal layer is etched by photolithography to form a gate electrode 121a in a TFT region VI-VI' and a gate line 121 in a region IV-IV'. Simultaneously, the hole 126 where the column spacer will be formed or positioned is defined by etching the metal layer in the region IV-IV'.

Figure 8B:
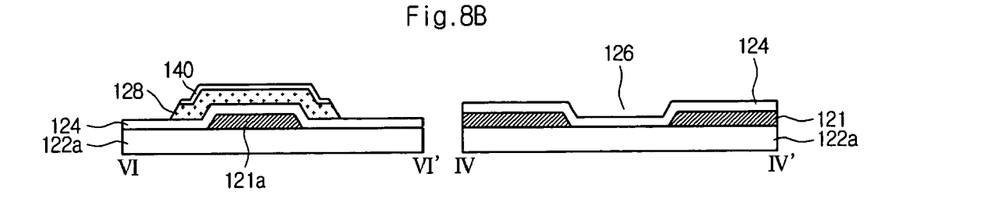

As shown in FIG. 8B, a gate insulating layer 124 is deposited over the first insulating substrate 122a where the gate electrode 121a and the gate line 121 are formed. Subsequently, an amorphous silicon layer and a doped amorphous silicon layer are deposited over the first insulating substrate 122a in sequence. Then, the resultant is etched by photolithography to form an channel layer 128 and an ohmic contact layer 140 in the VI-VI' region. In the IV-IV' region, however, both the amorphous silicon layer and the doped amorphous silicon layer are removed to expose the gate insulating layer 124 over the gate line 121.

Figure 8C:
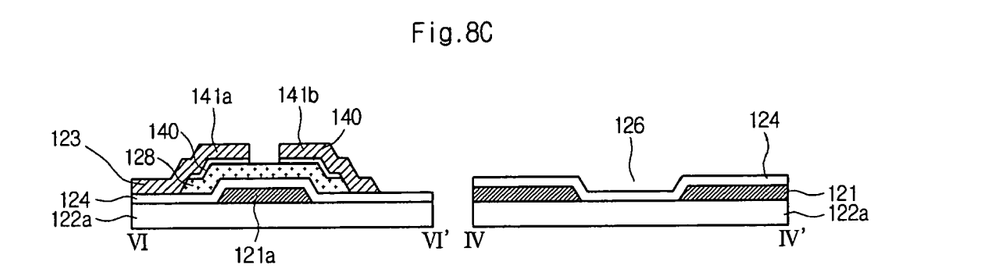
Figure 8D:
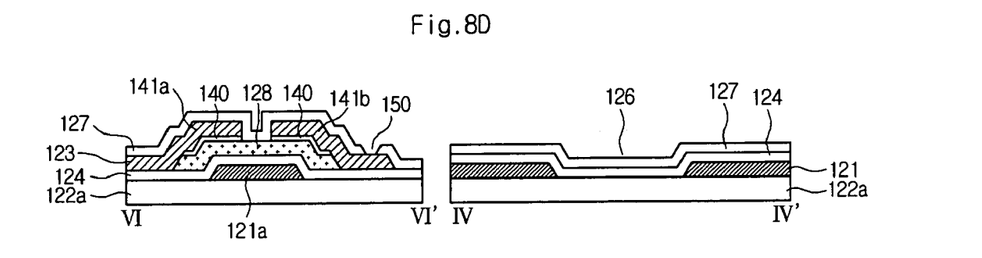

As shown in FIG. 8C, after the active layer (the channel layer 128 and the ohmic contact layer 140) is formed, a metal layer is deposited over the first insulating substrate 122a. Then, the metal layer is etched to form a source electrode 141a, a drain electrode 141b, and the data line 123 in the VI-VI' region. The data line 123 is formed extending from the source electrode 141a. In the IV-IV' region, however, the metal layer is entirely etched so that the gate insulating layer 124 is exposed. Next, as shown in FIG. 8D, after forming the source and the drain electrodes 141a and 141b, a passivation layer 127 is deposited over the first insulating substrate 122a. Thereafter, a contact hole 150 is defined through the passivation layer 127 to expose a portion of the drain electrode 141b. The passivation layer 127 deposited over the gate insulating layer 124 in the IV-IV' region remains. Then, as shown in FIG.

Figure 8E:
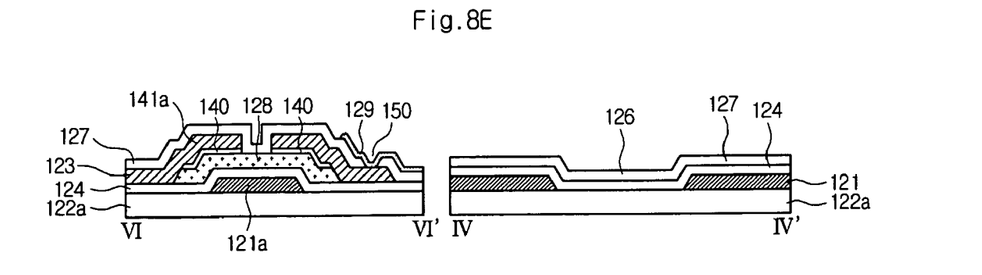

8E, after completing the contact hole 150 formation process, the transparent metal layer is deposited over the first insulating substrate 122a and etched to form a pixel electrode 129 in the VI-VI' region.

When attaching the TFT substrate (formed through the above described fabricating processes) to the color filter substrate, the cell gap between the color filter substrate and the TFT substrate may be controlled by the hole 126 upon formation of the column spacer 125 within the hole 126. More precisely, the cell gap may be reduced to the thickness of the gate line 121 when the hole 126 is used. Accordingly, when the color filter substrate is attached to the TFT substrate having the column spacer positioned within the hole 126 as shown in FIG. 8E, the cell gap becomes the first cell gap of H1.

Figure 9:
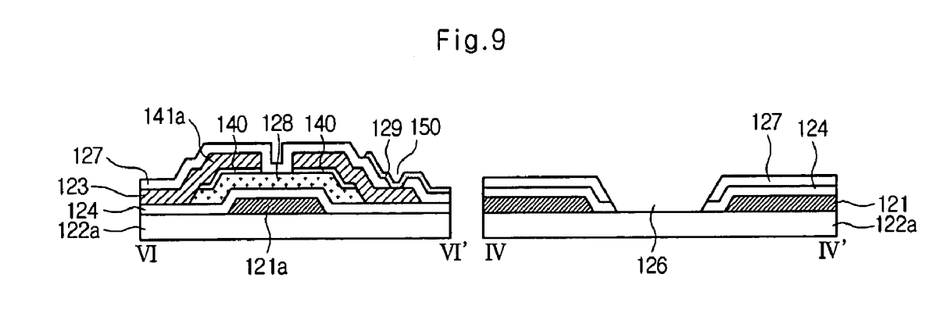
FIG. 9 is a cross-sectional view illustrating a second exemplary fabricating method of the MMG model LCD according to the second exemplary embodiment of the present invention.

FIG. 9 is a cross-sectional view illustrating a second exemplary fabricating method of MMG model LCD according to the second embodiment of the present invention. As illustrated in FIG. 9, the hole 126 in the IV-IV' region is defined by etching a portion of the gate line 121, the gate insulating layer 124, and the passivation layer 127 completely. Simultaneously, the contact hole 150 is defined in the VI-VI' region. The hole 126 exposes the first insulating substrate 122a. Accordingly, unlike the TFT substrate as shown in FIG. 8E, since the column spacer will be placed over the first insulating substrate 122a, the cell gap is reduced even more in spite of employing the same sized column spacer 125. The cell gap formed by attaching the TFT substrate of FIG. 9 and the color filter substrate becomes the third cell gap H3.

In addition, when the column spacer 125 is positioned or formed over the data line 123, the cell gap of H2 as illustrated in FIG. 5B may be achieved using both the first and second exemplary MMG model TFT substrates of the present invention. As a result, the hole 126 can be formed in the various locations where the column spacer will be formed or positioned, without changing the height of the column spacer 125, thus securing the various viewing angles.

Therefore, the MMG model LCD according to the exemplary embodiments of the present invention, the liquid crystal cells are fabricated having various cell gaps and sizes. Accordingly, various viewing angles corresponding to the wide view polarizer can be obtained. Specifically, as shown in FIGS. 5A and 8A to 8E, the column spacer may be formed or positioned within the hole 126 to obtain the first cell gap H1. Furthermore, as shown in FIGS. 6 and 9, the column spacer may be placed over the data line 123 or within the hole 126 to obtain the second or the third cell gap H2 or H3. Thus, the exemplary embodiments of the present invention provide advantages that the liquid crystal cells having various sizes may be fabricated through single process, various cell gaps may be formed and each of the liquid crystal cells may be formed having different viewing angles.

It will be apparent to those skilled in the art that various modifications and variations can be made in the liquid crystal display device and method for manufacturing the same of the present invention without departing from the spirit or scope of the invention. Thus, it is intended that the present invention cover the modifications and variations of this invention provided they come within the scope of the appended claims and their equivalents.

What is claimed is:

1. A mother glass panel for manufacturing a plurality of liquid crystal displays (LCD), comprising:
    a first substrate;
    a second substrate attached to the first substrate, wherein column spacers are disposed between the first and second substrates to form cell gaps; and
    a liquid crystal layer interposed between the first substrate and the second substrate, wherein the mother glass panel defines a plurality of liquid crystal display regions and at least two of the liquid crystal display regions have different cell gaps, wherein the column spacers are equal in height to one another.

2. The liquid crystal display according to claim 1, wherein the plurality of liquid crystal displays has different display sizes.

3. The liquid crystal display according to claim 1, wherein at least one of the column spacers is disposed in a hole defined through a gate line on the second substrate.

4. The liquid crystal display according to claim 1, wherein at least one of the column spacers is disposed in a hole defined through a passivation layer, a gate insulating layer and a gate line on the second substrate.

5. The liquid crystal display according to claim 1, wherein at least one of the column spacers is disposed over a data line on the second substrate.

6. The liquid crystal display according to claim 1, wherein at least one of the column spacers is disposed over the black matrix on the first substrate.

7. The liquid crystal display according to claim 1, wherein the first substrate is a color filter substrate such that a color filter layer and a black matrix are formed thereon.

8. The liquid crystal display according to claim 1, wherein the second substrate is a thin film transistor (TFT) substrate such that a TFT and a pixel electrode are formed thereon.

9. The liquid crystal display according to claim 1, wherein the plurality of liquid crystal display regions having different cell gaps are formed by controlling locations where column spacers are disposed on the first substrate or the second substrate.

10. The liquid crystal display according to claim 9, wherein the column spacers are equal in height to one another.

11. The liquid crystal display according to claim 1, wherein the second substrate is made of glass.

12. A method for manufacturing a plurality of liquid crystal displays, the method comprising:
    forming gate lines, data lines and thin film transistors on a first insulating substrate, wherein the thin film transistors are formed at intersections of the gate lines and the data lines;
    forming pixel electrodes in pixel regions, wherein the pixel regions are defined by intersections of the gate and data lines;
    disposing column spacers on the first or a second insulating substrates to form cell gaps;
    attaching the first insulating substrate and the second insulating substrate; and
    cutting the attached substrates to form the plurality of liquid crystal displays, wherein at least two of the liquid crystal displays have different cell gaps,
    wherein the column spacers are equal in height to one another.

13. The method according to claim 12, further comprising:
    a first hole defined through the gate line in one of the at least two liquid crystal displays such that at least one of the column spacers is disposed within the first hole.

14. The method according to claim 12, further comprising:
    a second hole defined through a passivation layer, a gate insulating layer and the gate line in one of the at least two liquid crystal displays such that a portion of the first insulating substrate is exposed in the second hole and at least one of the column spacers is disposed within the second hole.

15. The method according to claim 12, wherein at least one of the column spacers is disposed over the data line.

16. The method according to claim 15, wherein a second cell gap is formed by disposing at least one column spacer within the second hole.

17. The method according to claim 15, wherein a third cell gap is formed by disposing at least one column spacer over the data line.

18. The method according to claim 12, wherein at least one of the column spacers is disposed over the black matrix on the second insulating substrate.

19. The method according to claim 12, wherein the plurality of liquid crystal displays includes at least one of three different cell gaps.

20. The method according to claim 19, wherein a first cell gap is formed by disposing at least one column spacer within the first hole.

21. The method according to claim 12, wherein the first insulating substrate is made of glass.

22. A mother glass panel for manufacturing a plurality of liquid crystal displays (LCD), comprising:

a first insulating substrate;

data lines, gate lines, thin film transistors and pixel electrodes on a second insulating substrate;

at least one first hole defined through portions of the gate lines;

at least one second hole defined through portions of a passivation layer, a gate insulating layer and portions of the gate lines;

column spacers disposed on the first or second insulating substrates, wherein at least one column spacer is disposed within the first hole forming a first cell gap, at least another column spacer is disposed within the second hole forming a second cell gap, and at least another column spacer is disposed on the data line forming a third cell gap; and a liquid crystal layer interposed between the first and second insulating substrates, wherein the column spacers are equal in height to one another.

* * * * *